United States Patent [19]
Müller

[11] Patent Number: 5,392,665
[45] Date of Patent: Feb. 28, 1995

[54] MANUAL TRANSMISSION OF A MOTOR VEHICLE

[75] Inventor: Robert Müller, Mönsheim, Germany

[73] Assignee: Dr. Ing., h.c.f. Porsche AG, Weissach, Germany

[21] Appl. No.: 22,098

[22] Filed: Feb. 25, 1993

[30] Foreign Application Priority Data

Feb. 25, 1992 [DE] Germany ............... 4205668

[51] Int. Cl.6 ............................. F16H 3/08
[52] U.S. Cl. ...................... 74/330; 74/333
[58] Field of Search ............ 74/330, 333, 358, 359

[56] References Cited

U.S. PATENT DOCUMENTS

| | | | |
|---|---|---|---|
| 4,038,882 | 8/1977 | Keller | 74/331 |
| 4,658,663 | 4/1987 | Hiraiwa | 74/330 |
| 4,823,628 | 4/1989 | Hiraiwa | 74/330 |
| 5,085,092 | 2/1992 | Koga | 74/333 |
| 5,125,282 | 6/1992 | Bender et al. | 74/359 |
| 5,181,431 | 1/1993 | Zaiser et al. | 74/333 |
| 5,226,339 | 7/1993 | Donato et al. | 74/333 |
| 5,259,260 | 11/1993 | Schneider | 74/333 |
| 5,280,731 | 1/1994 | Turpin | 74/333 |

FOREIGN PATENT DOCUMENTS

| | | |
|---|---|---|
| 0314644 | 5/1989 | European Pat. Off. . |
| 934514 | 10/1955 | Germany . |
| 1580101 | 10/1970 | Germany . |
| 2445241 | 4/1976 | Germany . |
| 341353 | 2/1978 | Germany . |

*Primary Examiner*—John T. Kwon
*Attorney, Agent, or Firm*—Evenson, McKeown, Edwards & Lenahan

[57] ABSTRACT

A manual transmission shifted by synchronizer clutches, in which the transmission gears situated between an input shaft and an output shaft are arranged such that, for the shifting of all forward gears, two clutches respectively are closed. A synchronizer clutch participates in the shifting of all forward gears. By bringing the sliding sleeve of the synchronizer clutch into its neutral zero position, a shifting directly into idling can take place from any shifted gear.

11 Claims, 9 Drawing Sheets

| | | $\varphi$ | $\psi$ |
|---|---|---|---|
| G1 | 3.750 | | |
| | | 1.760 | |
| G2 | 2.131 | | |
| | | 1.424 | |
| G3 | 1.496 | | 6.00 |
| | | 1.360 | |
| G4 | 1.100 | | |
| | | 1.294 | |
| G5 | 0.850 | | |
| | | 1.360 | |
| G6 | 0.625 | | |

| i1 = i2 × i4/i6 |
|---|
| i3 = i5 × i4/i6 |

MANUAL TRANSMISSION OF A MOTOR VEHICLE

BACKGROUND AND SUMMARY OF THE INVENTION

The present application is related to U.S. Ser. No. 08/022,107, and U.S. Ser. No. 08/022,108 filed on Feb. 25, 1993.

The present invention relates to a manual transmission of a motor vehicle, comprising a plurality of forward gears, which can be shifted via synchronizer clutches, and one reverse gear.

In the book "Mechanical Transmissions", by Johannes Loomann, Springer-Verlag Berlin, 1988, Page 10, auxiliary transmissions are described which represent a normally two-speed range transmission which is connected in front of or behind the normal manual transmission. They have the purpose of increasing the number of gears and the gearing range of the transmission by the multiple utilization of the gearwheel sets. It is stated there that, in the case of an interaction with an auxiliary transmission, the gearing ratios $\phi$ in all steps must be approximately identical; that is, they must form a geometrical row in order to avoid irregularly alternating large and small gearing ratios.

It is an object of the invention to provide a manual transmission comprising an auxiliary transmission which, deviating from the geometrical grading, results in a gear grading $\phi$ which increases in the direction of the lower gears.

This and other objects are achieved by the present invention which provides a manual transmission of a motor vehicle, comprising transmission gears that include a plurality of forward gears and one reverse gear, synchronizer clutches which shift the gears, with all of the transmission gears being arranged such that they can be shifted only by simultaneous closing of two of the synchronizer clutches which are assigned to each gear. The transmission gears are arranged such that a progressive gear grading is provided, with a first range shifting implemented between adjacent transmission gears and a second range shifting implemented between non-adjacent transmission gears.

When a first range shifting is implemented between adjacent gears G1 and G2 and a second range shifting is implemented between the non-adjacent gears G3 and G5, a progressive grading can be achieved which rises in the direction of the lower gears, without the occurrence of irregularly alternating gearing ratios. This progressive grading is desirable in order to achieve a larger spread in the lower gears.

In an embodiment of the invention, for a 6-gear transmission, gears G2, G4, G5 and G6 each have a fixed-wheel loose-wheel gearwheel pair. The first gear G1 is formed by the gearwheel pair of G2 and the gears G4 and G6 which are connected behind it as an auxiliary transmission. The third gear G3 is formed by the gearwheel pair of G5 and the gears G4 and G6 which are connected as an auxiliary transmission. Since the gearwheel pairs of G4 and G6, which already exist in the manual transmission, are used as the auxiliary gears, additional gearwheel pairs are not required so that the manufacturing costs and the installation space of the transmission may be kept very low.

Other objects, advantages and novel features of the present invention will become apparent from the following detailed description of the invention when considered in conjunction with the accompanying drawings.

DETAILED DESCRIPTION OF THE DRAWINGS

A central input shaft 2 of the manual transmission is driven via a clutch 1. On the input shaft 2, a hollow shaft 3 is rotatably disposed which can be connected with the input shaft 2 in a torque-transmitting manner by a clutch E constructed as half of a synchronizer clutch. A sliding sleeve 4 which actuates the clutch E is arranged non-rotatably and longitudinally slidably with respect to the input shaft 2.

On the input shaft 2, the fixed wheel 5 of the reverse gear R, the fixed wheel 6 of the second gear G2, and the fixed wheel 7 Of the fifth gear G5 are arranged in this sequence. These are followed by the fixed wheel S of the sixth gear G6 and the fixed wheel 9 of the fourth gear G4 on the hollow shaft 3. A fixed wheel 10 which meshes with the fixed wheel 8 is fastened on a second hollow shaft 11 in which an output shaft 12 is disposed in a centric manner. By means of the output shaft 12, a vehicle axle 14 is driven by way of an end gearwheel pair 13. On the other side of the output shaft 12, the wheel set of the reverse gear R is arranged, the fixed wheel 5 of the input shaft 2 engaging, by way of an idler gear, which is not shown, with a loose wheel 15 disposed on the output shaft 12. The loose wheel 15 can be coupled with the output shaft 12 half of a synchronizer clutch F whose gearshift sleeve 16 is non-rotatable with respect to the output shaft 12.

A loose wheel 17 disposed on the hollow shaft 11 meshes with the fixed wheel 6 of G2 and a loose wheel 18, which is also disposed on the hollow shaft 11, meshes with the fixed wheel 7 of G5. By means of a synchronizer clutch A-B whose sliding sleeve 19 is non-rotatable with respect to the hollow shaft 11, the loose wheel 17 can be coupled via the clutch A with the hollow shaft 11, and via the clutch B, the loose wheel 18 can be coupled with the hollow shaft 11.

With another synchronizer clutch C-D, whose sliding sleeve 20 is non-rotatable with respect to the output shaft 12, the hollow shaft 11 can be coupled with the output shaft 12 by way of the clutch C. By way of the clutch D, a loose wheel 21, which is disposed on the output shaft 12 and meshes with the fixed wheel 9 of G4, can be connected with the output shaft 12.

As indicated in the following table, for the shifting of all forward gears G1 to G6, two clutches simultaneously are brought into the closing position.

| Gear | Clutches | A | B | C | D | E | F |
|------|----------|---|---|---|---|---|---|
| 1.   | A D      | X |   |   | X |   |   |
| 2.   | A C      | X |   | X |   |   |   |
| 3.   | B D      |   | X |   | X |   |   |
| 4.   | E D      |   |   |   | X | X |   |
| 5.   | B C      |   | X | X |   |   |   |
| 6.   | E C      |   |   | X |   | X |   |
| R    | F        |   |   |   |   |   | X |

In FIGS. 1 to 6, the power flux in the manual transmission is illustrated by means of this numbering for each of the shifted gears 1 to 6. The respective participating clutches are circled with dash-dotted lines. The synchronizer clutch C-D participates in the shifting of all forward gears. Since, in its neutral zero position, the synchronizer clutch C/D causes the transmission idling, it is possible to shift from all shifted gears directly into idling and inversely from idling directly into any gear.

Gears G2, G5, G6 and G4 each consist of one gearwheel pair. Gear G1 is formed by gearwheel pair 6, 17 of G2 and gears G4 and G6 which are connected behind it as an auxiliary transmission. Together with the gearwheel pair 7, 18 of G5, gears G4 and G6 form the third gear G3.

Figure 1:
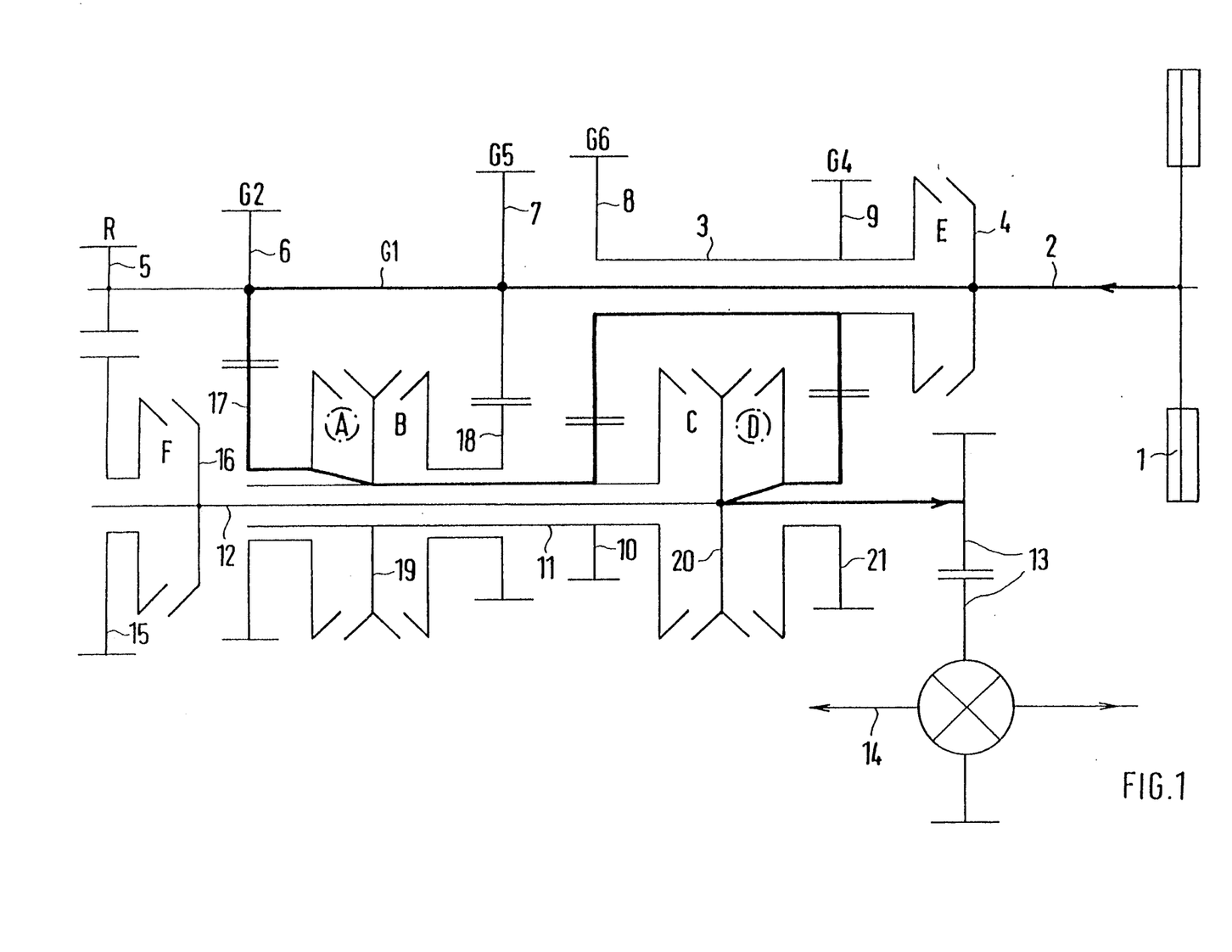
FIG. 1 is a view of the transmission diagram and the power flux in the first gear according to an embodiment of the present invention.
Figure 2:
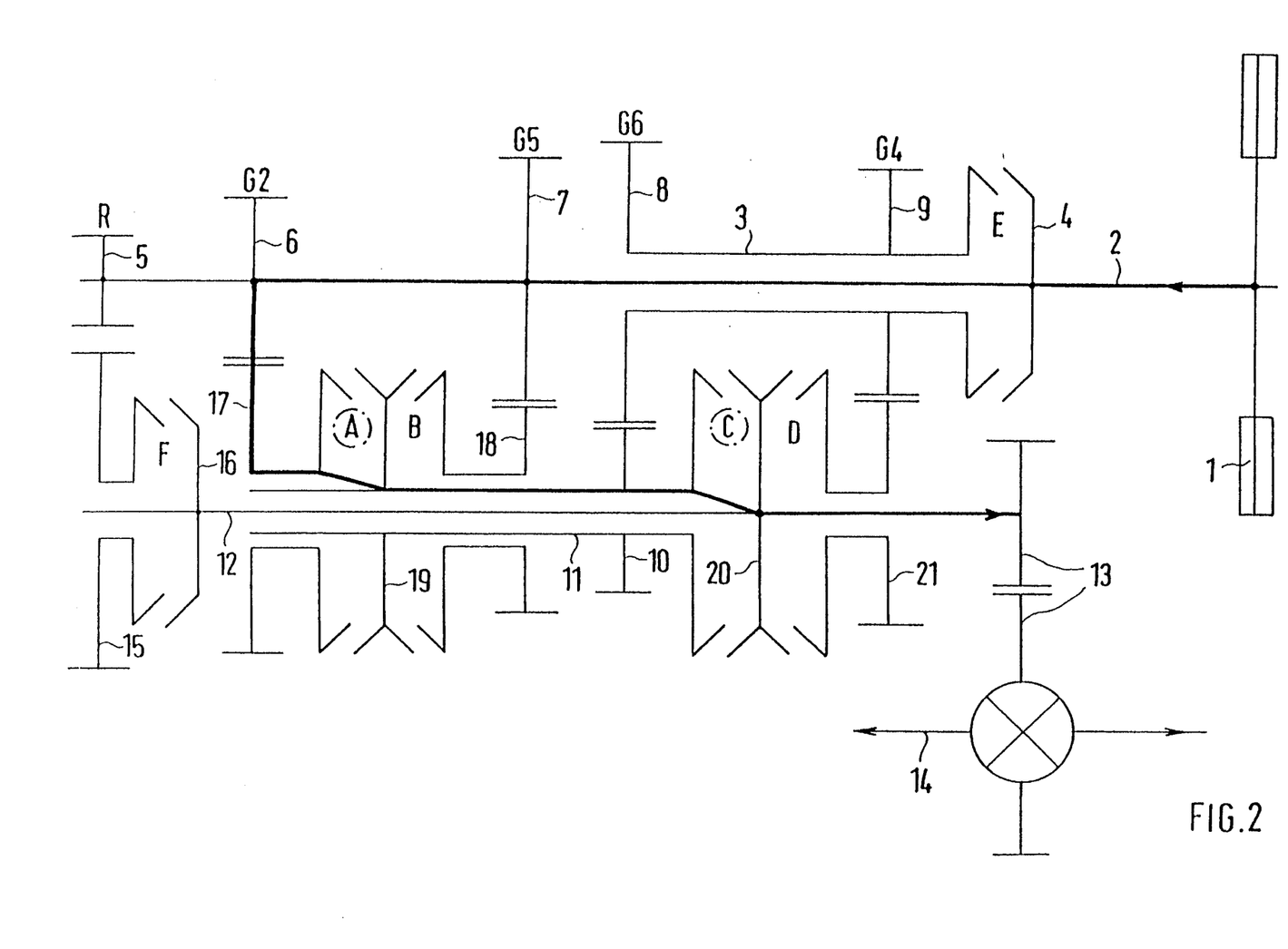
FIG. 2 is a view of the transmission diagram and the power flux in the second gear.
Figure 3:
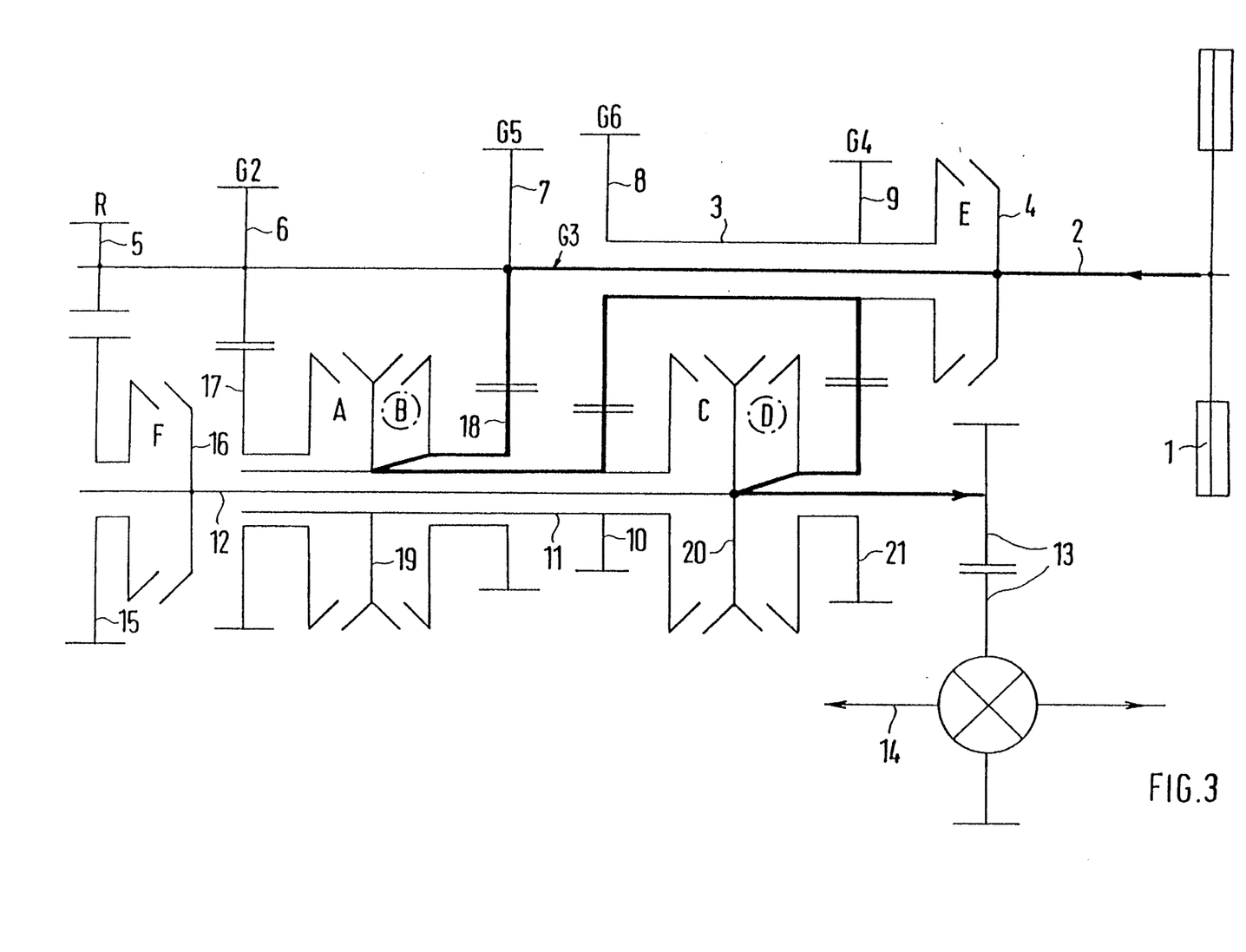
FIG. 3 is a view of the transmission diagram and the power flux in the third gear.
Figure 4:
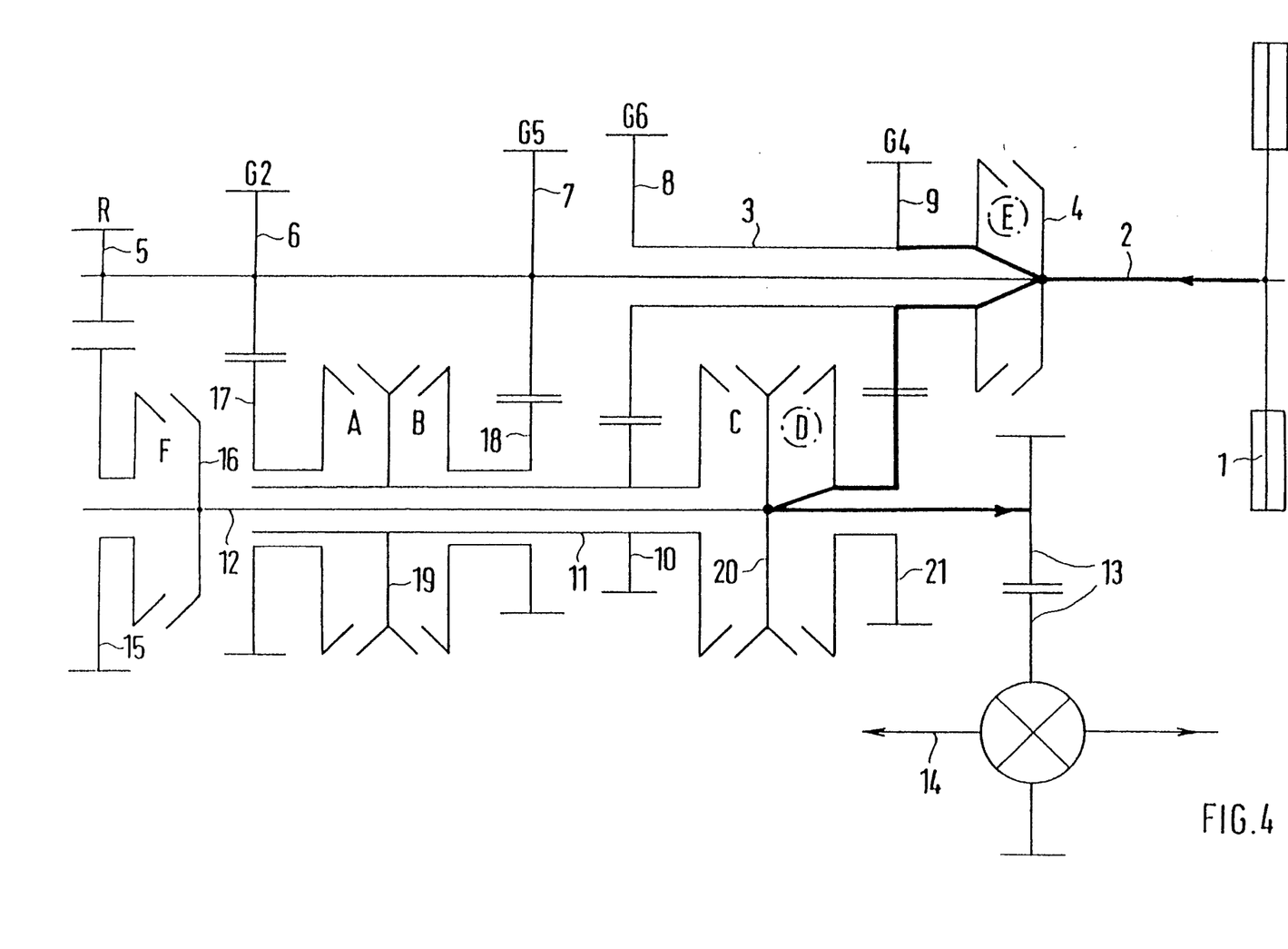
FIG. 4 is a view of the transmission diagram and the power flux in the fourth gear.
Figure 5:
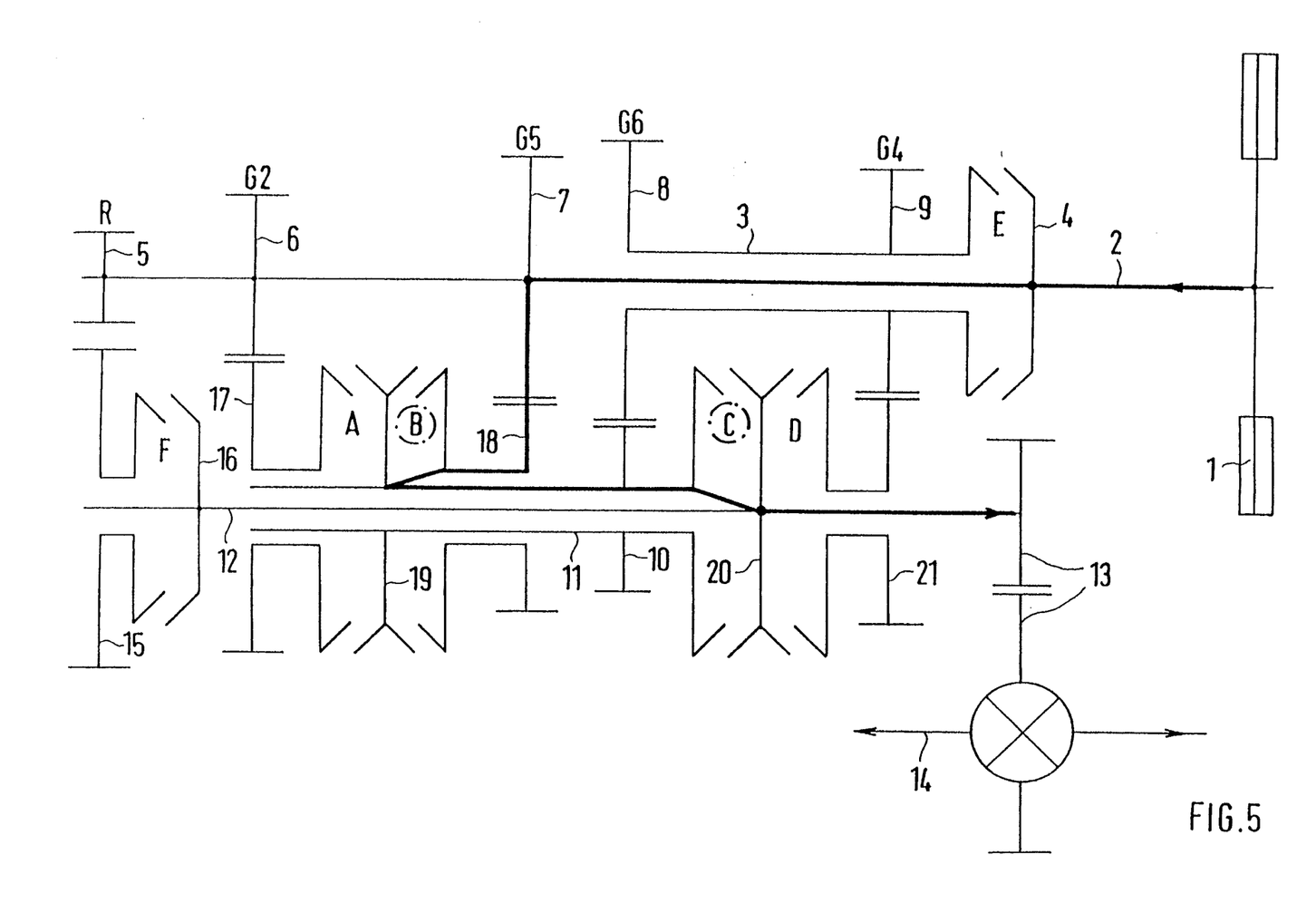
FIG. 5 is a view of the transmission diagram and the power flux in the fifth gear.
Figure 6:
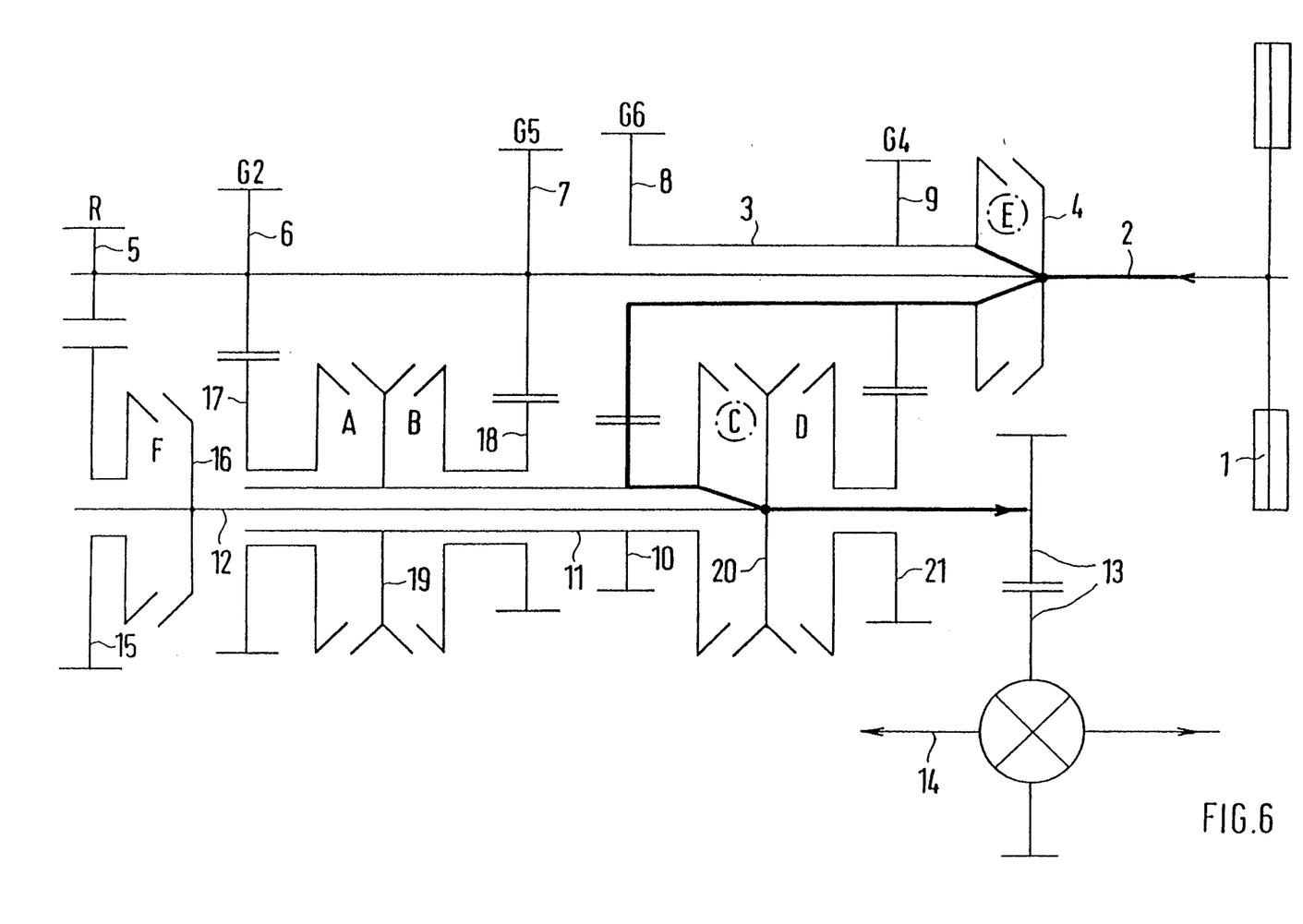
FIG. 6 is a view of the transmission diagram and the power flux in the sixth gear.
Figure 7:
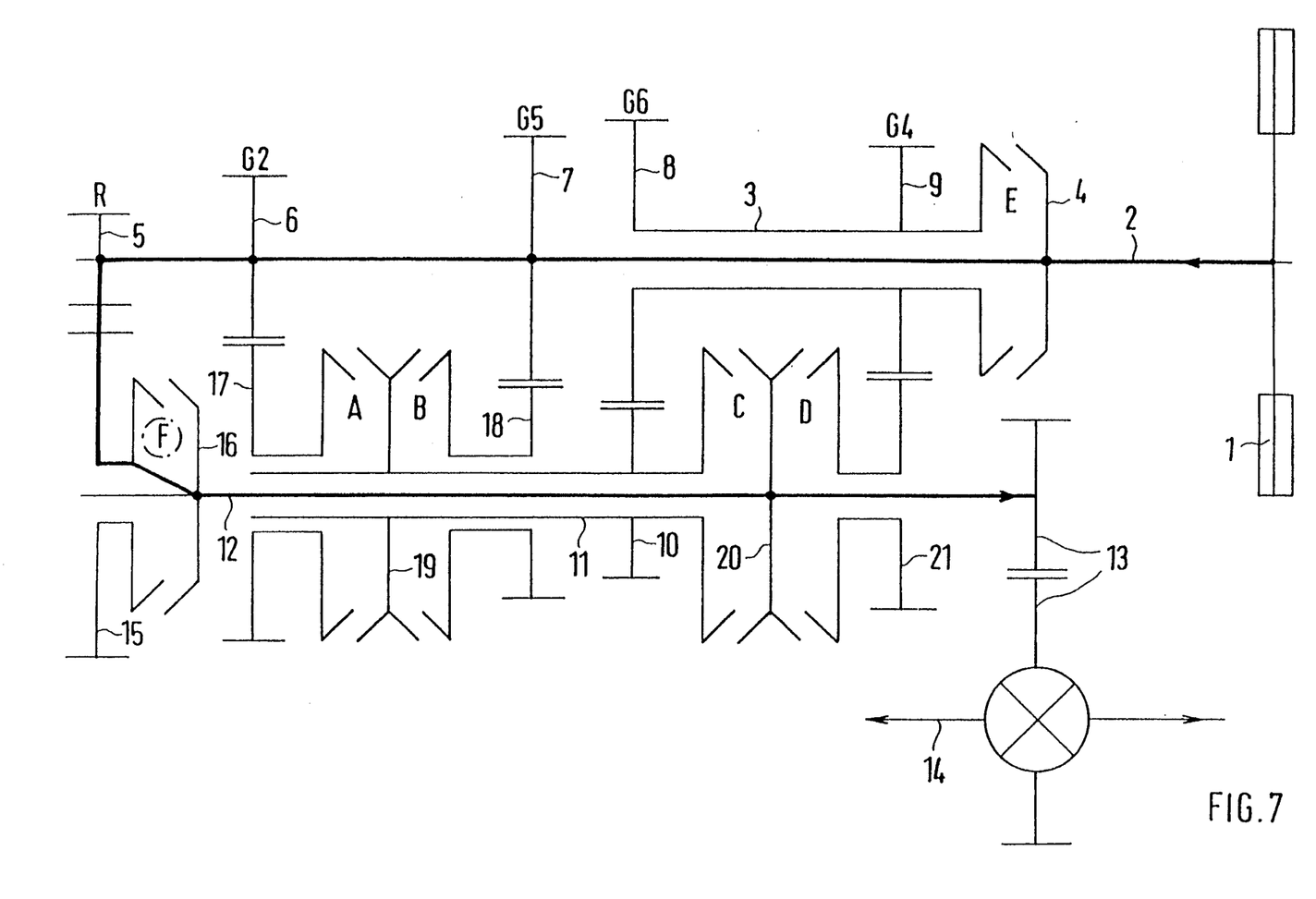
FIG. 7 is a view of the transmission diagram and the power flux in the reverse gear.
Figure 8A:
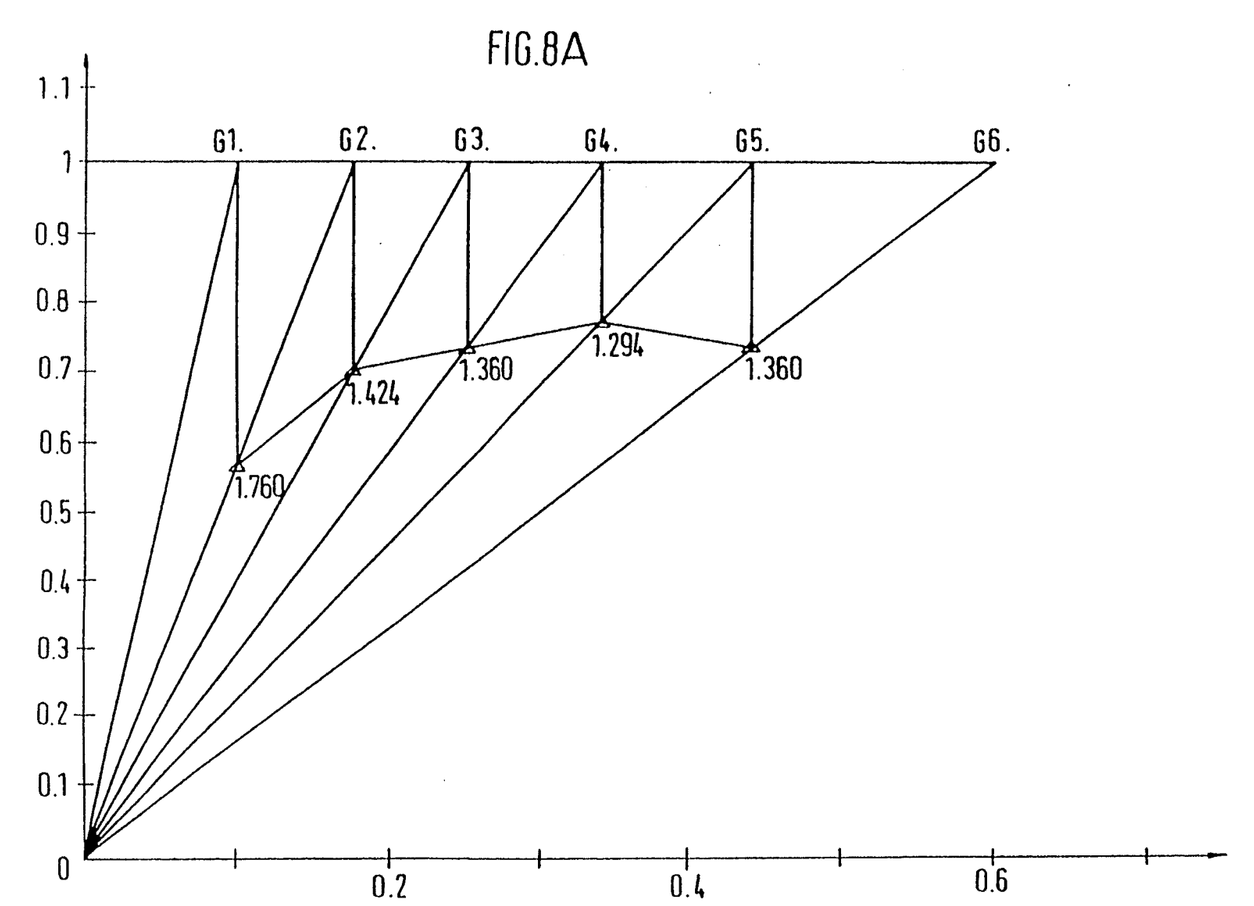
FIG. 8 is a diagram of the transmission grading.
Figure 8B:
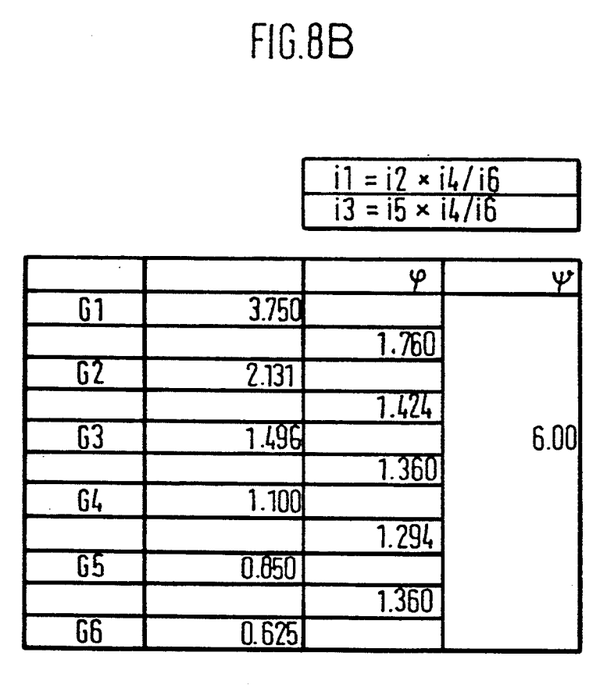

As illustrated in the diagram of FIG. 8, a progressive transmission grading is achieved. In this case, while using existing gearwheel pairs, a first range shifting is implemented between the adjacent transmission gears G1 and G2, and a second range shifting is implemented between the non-adjacent transmission gears G3 and G5.

The illustrated arrangement is to be considered exemplary only. According to the requirement (for example, transverse installation, longitudinal installation, particularly short wheel set, low-cost arrangement, etc.) different arrangements are possible within the scope of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A manual transmission of a motor vehicle, comprising:
    transmission gears that include a plurality of forward gears with a progressive gear grading and one reverse gear, the gears being formed by gear wheel pairs;
    synchronizer clutches controllably coupled to the gears to thereby shift the gears, with all said transmission gears being shiftable only upon simultaneous closing of two of said synchronizer clutches that are assigned to each gear;
    wherein a first pair of gear wheels form at least a part of two adjacent forward gears in a first range shifting, and a second pair of gear wheels form at least a part of two non-adjacent forward gears in a second range shifting.

2. A manual transmission according to claim 1, wherein one of said synchronizer clutches is active in the shifting of all of said forward gears and has a sliding sleeve, and according to the position of said sliding sleeve, provides one of a shiftable clutch and an idling of the transmission.

3. A manual transmission according to claim 1, comprising six forward gears, wherein four of the forward gears each consist of a gearwheel pair, with two of the four forward gears being shifted as an auxiliary transmission, and a first forward gear being formed by the gearwheel pair of one of the forward gears and the gearwheel pair of forward gears being shifted as the auxiliary transmission, and a third forward gear being formed by the gearwheel pair of another one of the forward gears and the gearwheel pair of the forward gears shifted as the auxiliary transmission.

4. A manual transmission according to claim 1, further a central input shaft, a first hollow shaft which is disposed on the input shaft and which drives, via one of said gearwheel pairs, a second hollow shaft which is disposed in parallel to the first and hollow shaft and in which a central output shaft is disposed, said gearwheel pair forming a sixth transmission gear.

5. A manual transmission according to claim 4, wherein fixed wheels of the second and fifth gears are arranged on the input shaft and the fixed wheels of the sixth and fourth gears are arranged on the first hollow shaft in these sequences.

6. A manual transmission according to claim 4, further comprising a first clutch which couples the first hollow shaft with the input shaft and a second clutch which couples the second hollow shaft with the output shaft.

7. A manual transmission according to claim 4, wherein the loose wheels of the second gear and of the fifth gear are arranged on the second hollow shaft and are connected with the second hollow shaft by clutches, such that said loose wheels mesh with fixed wheels of the input shaft.

8. A manual transmission according to claim 4, wherein the loose wheel of is disposed at one end of the output shaft and meshes the fourth gear with the fixed wheel disposed on the first hollow shaft and wherein the loose wheel of the reverse gear is disposed on the other end of the output shaft which engages via an idler with a fixed wheel of the input shaft and which is coupled with the output shaft via a clutch.

9. A manual transmission according to claim 8, further comprising another clutch which couples the first hollow shaft with the input shaft, wherein the clutches are combined in a synchronizer clutch which is arranged, together with the wheel set of the reverse gear, between the fifth and sixth gears.

10. A manual transmission according to claim 1 comprising six forward gears of gear ratios, wherein a progressive gear grading is implemented, the following relationship being applicable:

$$\frac{i1}{i2} = \frac{i3}{i5} = \frac{i4}{i6} = \frac{i3}{i4} \cdot \frac{i4}{i5}$$

11. A manual transmission according to claim 1, wherein the size of the step ratios rises continuously in the direction of the lower transmission gears.

* * * * *